(12) United States Patent
Hu

(10) Patent No.: US 11,932,523 B2
(45) Date of Patent: Mar. 19, 2024

(54) STACKED VEHICLE RAMP

(71) Applicant: QINGDAO NEWBIT INDUSTRIAL CO., LTD, Shandong (CN)

(72) Inventor: Lijun Hu, Shandong (CN)

(73) Assignee: QINGDAO NEWBIT INDUSTRIAL CO., LTD, Shandong (CN)

( * ) Notice: Subject to any disclaimer, the term of this patent is extended or adjusted under 35 U.S.C. 154(b) by 0 days.

(21) Appl. No.: 17/958,387

(22) Filed: Oct. 1, 2022

(65) Prior Publication Data
US 2023/0026263 A1   Jan. 26, 2023

(30) Foreign Application Priority Data

May 13, 2022   (CN) .......................... 202210521349.4

(51) Int. Cl.
*B66F 7/24*   (2006.01)
(52) U.S. Cl.
CPC .................................. *B66F 7/243* (2013.01)
(58) Field of Classification Search
CPC . B66F 7/243; B66F 7/24; F16M 11/02; B64F 1/16; B60T 3/00
See application file for complete search history.

(56) References Cited

U.S. PATENT DOCUMENTS

| 4,034,961 | A | * | 7/1977 | Breen ....................... | B60T 3/00 254/94 |
| 4,103,870 | A | * | 8/1978 | Murakami ............... | B60C 27/00 81/15.8 |
| 5,483,715 | A | * | 1/1996 | Fogarty ................... | B66F 7/243 14/71.1 |
| 7,040,461 | B2 | * | 5/2006 | Chrisco .................... | B60T 3/00 D12/217 |
| 7,854,032 | B2 | * | 12/2010 | Igwemezie ............. | B66F 7/243 14/69.5 |

(Continued)

*Primary Examiner* — Monica E Millner
(74) *Attorney, Agent, or Firm* — HOUTTEMAN LAW LLC

(57) ABSTRACT

The invention relates to the technical field of vehicle maintenance equipment, in particular, to a stacked vehicle ramp. The vehicle ramp includes a base frame. One end of the base frame is fixedly connected with a sloping plate, and both sides of the base frame are fixedly provided with a side plate. The other end of the base frame is fixedly connected with a rear plate, and a higher end of the sloping plate is fixedly connected with a top plate that is horizontally arranged. The sloping plate, the top plate and the rear plate are all fixedly connected between the two side plates, and one end of the top plate away from the sloping plate is fixedly connected to the rear plate. A first left groove and a first right groove are provided on the sloping plate, and the top plate is provided with a second left groove and a second right groove. The first left groove and the second left groove are both formed with left arc-shaped depressions, and both positions of the first right groove and the second right groove corresponding to the left arc-shaped depressions are formed with right arc-shaped depressions. The two side plates are provided with a plurality of arc-shaped grooves. The application has the effect that the support strength of the vehicle ramp can be greatly enhanced, and the vehicle ramp can also support the vehicle even by using lightweight materials.

10 Claims, 5 Drawing Sheets

(56) References Cited

U.S. PATENT DOCUMENTS

| | | | | |
|---|---|---|---|---|
| 8,251,350 | B2* | 8/2012 | Fick | B66F 7/243 |
| | | | | 248/352 |
| 8,782,839 | B1* | 7/2014 | Forbis | B66F 7/243 |
| | | | | 254/88 |
| 11,097,697 | B2* | 8/2021 | Hu | B64F 1/16 |
| D998,558 | S * | 9/2023 | Hua | D12/608 |
| 2006/0011422 | A1* | 1/2006 | Chrisco | B60T 3/00 |
| | | | | 188/5 |
| 2006/0027794 | A1* | 2/2006 | Heinz | B66F 7/243 |
| | | | | 254/88 |
| 2008/0201873 | A1* | 8/2008 | Haimoff | B66F 7/243 |
| | | | | 14/69.5 |
| 2014/0325770 | A1* | 11/2014 | Somers | B66F 7/243 |
| | | | | 14/69.5 |
| 2020/0307313 | A1* | 10/2020 | Hadley | B60B 39/12 |
| 2021/0253409 | A1* | 8/2021 | Eckert | B66F 7/243 |

* cited by examiner

STACKED VEHICLE RAMP

CROSS-REFERENCE TO RELATED PATENT APPLICATION

This application claims the benefit of priority to China Patent Application No. 202210521349.4, filed on May 13, 2022. The entire content of the above identified application is incorporated herein by reference.

FIELD OF THE INVENTION

The invention relates to the technical field of vehicle maintenance equipment, in particular, to a stacked vehicle ramp.

BACKGROUND OF THE INVENTION

Currently, many car owners will perform inspections, routine maintenance and repairs on their vehicles. In order to facilitate access to the bottom of the vehicle, they will raise the front or rear part of the vehicle to provide an accommodating working environment. Some amateur auto mechanics and car owners use a variety of portable ramps for this purpose. This kind of ramp is usually composed of metals and come in various configurations that enable the wheels to be driven up the sloping portion of the ramp and then enable the vehicle to land on a wheel securing area of the ramp.

A utility model CN204228424U claims a small portable inspection ramp of car parking braking. The small portable inspection ramp includes a plurality of same inspection slopes which are modified into a plurality of small inspection slopes with the same slope gradient of an inspection standard requirement, the plurality of small inspection ropes are respectively arranged under each wheel of a vehicle at the same time according to the coincident direction (for a vehicle with double wheels, a small inspection rope can be placed under any one of the double wheels), and the vehicle ascending parking inspection or vehicle descending parking inspection is carried out respectively.

In the above technical solution, since the existing vehicle ramp is usually composed of metals in order to carry the vehicle, it is heavy and occupies a large space, which is inconvenient for the user to move.

BRIEF SUMMARY OF THE DISCLOSURE

In order to solve the drawbacks in the prior art, the invention provides a stacked vehicle ramp.

The technical solutions of the invention are as follows:

The invention provides a stacked vehicle ramp, which includes a base frame, wherein one end of the base frame is fixedly connected with a sloping plate, and both sides of the base frame are fixedly provided with a side plate; the other end of the base frame is fixedly connected with a rear plate, and the sloping plate is inclined upward from one end of the base frame away from the rear plate to the other end; a higher end of the sloping plate is fixedly connected with a top plate that is horizontally arranged; the sloping plate, the top plate and the rear plate are all fixedly connected between the two side plates, and one end of the top plate away from the sloping plate is fixedly connected to the rear plate; the sloping plate is provided with a first left groove and a first right groove, and the first left groove and the first right groove are both arranged along a length direction of the sloping plate; the top plate is provided with a second left groove and a second right groove, and both the second left groove and the second right groove are arranged along a length direction of the top plate; the first left groove is communicated with the second left groove, and the first right groove is communicated with the second right groove; bottoms of the first left groove, the first right groove, the second left groove and the second right groove are all coplanar with a bottom of the base frame;

both the first left groove and the second left groove are formed with left arc-shaped depressions, and both positions of the first right groove and the second right groove corresponding to the left arc-shaped depressions are formed with right arc-shaped depressions; cross-sectional areas of the first left groove (21), the first right groove (22), the second left groove (41), the second right groove (42), the left arc-shaped depressions (211) and the right arc-shaped depressions (221) gradually increase from the bottom to the top; a convex surface of the left arc-shaped depression faces toward the right arc-shaped depression, and a convex surface of the right arc-shaped depression faces toward the left arc-shaped depression; the two side plates are proved with a plurality of arc-shaped grooves, and convex surfaces of the arc-shaped grooves are all arranged to face toward the side plate on the other side.

The invention has the following beneficial effects: the left arc-shaped depressions, the right arc-shaped depressions and the arc-shaped grooves may effectively improve the rigidity of the vehicle ramp, and the first left groove, the first right groove, the second left groove and the second right groove increase the contact area between the vehicle ramp and the ground, thereby increasing the strength of the vehicle ramp; an inner arch structure formed by the left arc-shaped depression and the right arc-shaped depression may share the lateral load and generate an internal stress to offset the horizontal shear force generated in the motion and the stationary state of the vehicle, thereby further increasing the strength of the vehicle ramp; longitudinal sections of the first left groove, the first right groove, the second left groove, the second right groove, the left arc-shaped depression and the right arc-shaped depression are of an inverted triangle shape to increase the dispersion effect of the vehicle ramp on the pressure above, and further increase the strength of the vehicle ramp, so that the vehicle ramp of the application may be sufficient to support the vehicle by using lightweight materials such as plastics to facilitate the user to carry and move, and the vehicle ramps may be stacked on top of each other since the bottoms are hollow to facilitate carrying a plurality of vehicle ramps in the vehicle at the same time without taking up too much space.

Further, a top of the rear plate is fixedly connected with a rear protrusion, a height of the rear protrusion exceeds the top plate, and one side of the rear protrusion close to the top plate is provided with a rear slope; the rear slope is inclined upward from one side close to the top plate to the other side, and the rear plate is provided with a third left groove and a third right groove, and the third left groove and the third right groove are both arranged vertically; the second left groove is communicated with the third left groove, and the second right groove is communicated with the third right groove; the third left groove is inclined from one end close to the top plate to the other end away from the third right groove, and the third right groove is inclined from one end close to the top plate to the other end away from the third left groove; positions of the rear plate close to the third left groove and the third right groove are both provided with rear arc-shaped depressions, and a concave surface of the rear arc-shape depression is arranged to face toward the top plate.

With the above solution, when the vehicle is driving on the vehicle ramp, the rear protrusion will block the wheels, reducing the possibility of the wheels running over the vehicle ramp and increasing the safety of use. The third left grooves and the third right grooves are distributed in an Y shape on the vehicle ramp, and are communicated with the second left groove and the second right groove, so that the third left groove and the third right groove may effectively eliminate the pressure of the wheels when the wheels contact the rear slope, thereby further increasing the strength of the vehicle ramp.

Further, bottoms of the arc-shaped groove and the rear arc-shaped depression are fixedly connected with an arc-shaped plate, and the arc-shaped plate is fixedly connected on the base frame.

With the above solution, the arc-shaped plate increases the contact area between the vehicle ramp and the ground, and the arc-shaped plate is also conducive to the shaping of the left arc-shaped depression, the right arc-shaped depression and the rear arc-shaped depression, thereby further increasing the strength of the vehicle ramp.

Further, a plurality of first anti-skid blocks are fixedly connected to the sloping plate near a lower end; a bottom of the arc-shaped plate just below the top plate, and positions of the second left groove and the second right groove close to the rear plate are both fixedly connected with a second anti-skid block; bottoms of the first anti-skid block and the second anti-skid block are both fixed with a first anti-skid pattern.

With the above solution, the friction between the vehicle ramp and the ground is effectively enhanced, the wear on the bottom of the product is reduced, and the product life is prolonged. When the vehicle tires are on the sloping plate, the first anti-skid block will be forced to prevent the vehicle from sliding on the ramp; when the vehicle tires are moved to the top plate, the second anti-skid block is forced to prevent the vehicle from sliding on the ramp; when the vehicle continues to drive so that the tires reach the rear plate, the second anti-skid blocks at the positions of the second left groove and the second right groove close to the rear plate will be forced to prevent the vehicle from sliding on the ramp.

Further, widths of the first left groove, the first right groove, the second left groove, the second right groove, the third left groove and the third right groove gradually decrease from the top to the bottom; the bottom of the third left groove is fixedly connected with a left support plate, the left support plate is fixedly connected on the second left groove, and an inclination direction of the left support plate is the same as an inclination direction of the third left groove; the bottom of the third right groove is fixedly connected with a right support plate, the right support plate is fixedly connected on the second right groove, and an inclination direction of the right support plate is the same as an inclination direction of the third right groove; bottoms of the left support plate and the right support plate are both coplanar with the bottom of the base frame.

With the above solution, the tapered structure with a narrow bottom and a wide top increases strength of the vehicle ramp and makes the vehicle ramp easier to stack on each other, and the left support plate and the right support plate may effectively extend the third left groove and the third right groove to increase the strength of the rear part of the vehicle ramp.

Further, bottoms of the first left groove, the first right groove, the second left groove and the second right groove are all provided with drainage depressions, and positions of the bottoms of the first left groove, the first right groove, the second left groove and the second right groove corresponding to the drainage depressions are all provided with drainage through grooves.

With the above solution, after water enters the first left groove, the first right groove, the second left groove or the second right groove, water may be drained through the drainage through groove and will not accumulate inside, and the drainage depression is used to ensure that the drainage through groove has a certain height with respect to the ground to ensure smooth drainage.

Further, the positions of the bottoms of the first left groove, the first right groove, the second left groove and the second right groove corresponding to the drainage depressions are all provided with a plurality of drainage reinforced ribs, and the drainage reinforced ribs are all arranged along a width direction of the base frame.

With the above solution, the drainage reinforced rib makes up for the disadvantage of weakening the strength of the bottom of the vehicle ramp caused by the drainage depression, and ensures the strength of the bottom of the vehicle ramp.

Further, outer sides of the second left groove and the second right groove and bottoms of the sloping plate and the top plate are fixedly connected with a plurality of horizontal reinforced ribs, and the bottoms of the sloping plate and the top plate are fixedly connected with a plurality of vertical reinforced ribs; the horizontal reinforced ribs are all arranged along the width direction of the base frame, and the vertical reinforced ribs are all arranged along a length direction of the base frame; heights of bottoms surface of the horizontal reinforced ribs and the vertical reinforced ribs are higher than a height of the base frame.

With the above solution, the horizontal reinforced rib and the vertical reinforced rib increase the strength of the vehicle ramp, but will not affect the stacking of the vehicle ramp due to their larger height.

Further, the bottoms of the plurality of horizontal reinforced ribs are fixedly connected with round-shaped reinforced ribs.

With the above solution, the round-shaped reinforced rib is used to strengthen the strength of the horizontal reinforced rib under key stress.

Further, both sides of the sloping plate are fixedly connected with first side rails, and both sides of the top plate are fixedly connected with second side rails; the first side rails are all arranged along a length direction of the sloping plate, and the second side rails are all arranged along a length direction of the top plate; the first side rail is higher than an upper surface of the sloping plate, and the second side rail is higher than an upper surface of the top plate.

With the above solution, the first side rail and the second side rail are used to block the wheels on the vehicle ramp from falling off to both sides of the vehicle ramp.

The stacked vehicle ramp of the invention has the following advantages:
1. The left arc-shaped depressions, the right arc-shaped depressions and the arc-shaped grooves may effectively improve the rigidity of the vehicle ramp, and the first left groove, the first right groove, the second left groove and the second right groove increase the contact area between the vehicle ramp and the ground, thereby increasing the strength of the vehicle ramp; an inner arch structure formed by the left arc-shaped depression and the right arc-shaped depression may share the lateral load and generate an internal stress to offset the horizontal shear force generated in the motion and the stationary state of the vehicle, thereby further increasing the strength of the vehicle ramp; in this way, the vehicle ramp of the application may be sufficient to support the vehicle by using lightweight materials such as plastics to facilitate the user to carry and move, and the vehicle ramps may be stacked on top of each other since the bottoms are hollow to facilitate carrying a plurality of vehicle ramps in the vehicle at the same time without taking up too much space.

Figure 1:
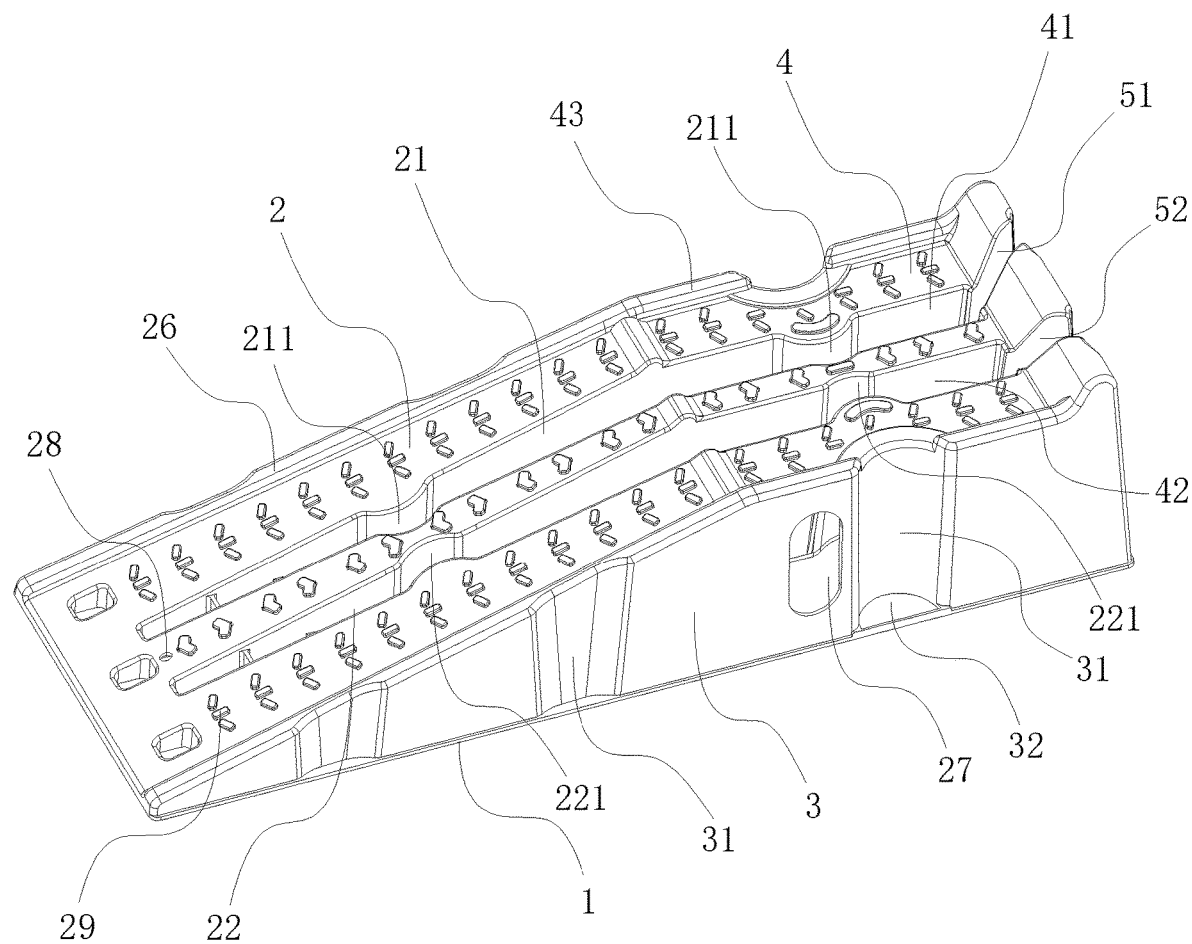
FIG. 1 is an integral structural diagram according to the invention.

In figures: 1. Base frame; 2. Sloping plate; 21. First left groove; 211. Left arc-shaped depression; 212. Second anti-skid block; 213. Drainage depression; 214. Drainage through groove; 215. Drainage reinforced rib; 22. First right groove; 221. Right arc-shaped depression; 23. First anti-skid block; 231. First anti-skid patter; 24. Horizontal reinforced rib; 241. Round-shaped reinforced rib; 25. Vertical reinforced rib; 26. First side rail; 27. Handle groove; 28. Connecting through hole; 29. Second anti-skid pattern; 3. Side plate; 31. Arc-shaped groove; 32. Arc-shaped plate; 4. Top plate; 41. Second left groove; 42. Second right groove; 43. Second side rail; 5. Rear plate; 51. Third left groove; 511. Left support plate; 52. Third right groove; 521. Right support plate; 53. Rear protrusion; 531. Rear slope; 54. Rear arc-shaped depression.

DETAILED DESCRIPTION OF THE INVENTION

In order to facilitate the understanding of the invention by those skilled in the art, the specific embodiments of the invention are described below with reference to the accompanying drawings.

In the description of the application, it should be noted that orientations or position relationships indicated by terms "center", "upper", "lower", "left", "right", "vertical", "horizontal", "inside", "outside" and the like are orientations or position relationships shown in the drawings, and these terms are merely for facilitating description of the present invention and simplifying the description, but not for indicating or implying that the mentioned device or elements must have a specific orientation and must be established and operated in a specific orientation, and thus, these terms cannot be understood as a limitation to the present invention. Moreover, terms like "first", "second", "third" etc. are only used for description, not be considered as a designation or designation of relative importance.

In the description of the application, it should be noted that unless otherwise specified and limited, the terms "mounting", "connected" and "connection" should be understood in a broad sense, for example, they may be fixed connection, detachable connection or integrated connection; they may be mechanical connection or electrical connection; and they may be direct connection or indirect connection through an intermediate medium, or internal communication of two components. For those skilled in the art, the specific meaning of the above terms in the application could be understood according to specific circumstances.

Figure 2:
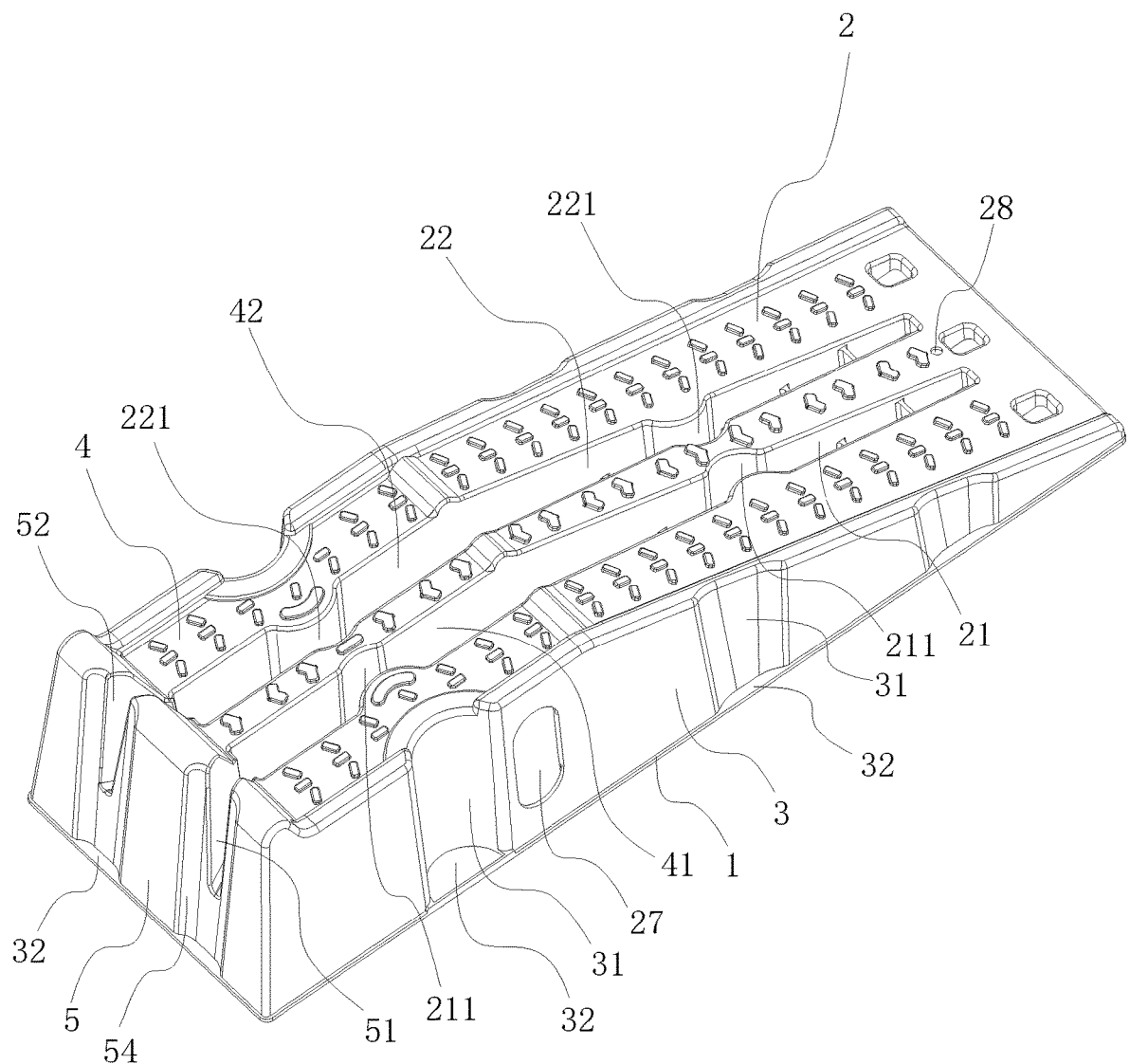
FIG. 2 is a diagram of a rear plate and a side plate according to the invention.

The invention provides a stacked vehicle ramp, with reference to FIGS. 1 and 2, which includes a base frame 1, wherein one end of the base frame 1 is fixedly connected with a sloping plate 2, and both sides of the base frame 1 are fixedly provided with a side plate 3; the other end of the base frame 1 is fixedly connected with a rear plate 5, and the sloping plate 2 is inclined upward from one end of the base frame 1 away from the rear plate 5 to the other end; a higher end of the sloping plate 2 is fixedly connected with a top plate 4 that is horizontally arranged; the side plates 3 are all arranged to be inclined downward from one side close to the top plate 4 to the other side. The sloping plate 2, the top plate 4 and the rear plate 5 are all fixedly connected between the two side plates 3, and one end of the top plate 4 away from the sloping plate 2 is fixedly connected to the rear plate 5. The vehicle ramp is entirely made of plastic.

As shown in FIGS. 1 and 2, a second anti-skid pattern 29 is fixedly connected on both of the sloping plate 2 and the top plate 4. The second anti-skid pattern 29 is used to increase the friction between the vehicle ramp and the wheels. A position of the slope close to a lower end is provided with a connecting through hole 28. The connecting through hole 28 may be used to install fasteners to fix the vehicle ramp, and a plurality of vehicle ramps may also be tied or hoisted through the connecting through hole 28 with cable ties, ropes, or the like. Both of the two side plates 3 are provided with a handle groove 27. The handle groove 27 facilitates the user to move the vehicle ramp.

As shown in FIGS. 1 and 2, both sides of the sloping plate 2 are fixedly connected with first side rails 26, and both sides of the top plate 4 are fixedly connected with second side rails 43; the first side rails 26 are all arranged along a length direction of the sloping plate 2, and the second side rails 43 are all arranged along a length direction of the top plate 4; the first side rail 26 is higher than an upper surface of the sloping plate 2, and the second side rail 43 is higher than an upper surface of the top plate 4. The first side rail 26 and the second side rail 43 are used to block the wheels on the vehicle ramp from falling off to both sides of the vehicle ramp.

As shown in FIGS. 1 and 2, the sloping plate 2 is provided with a first left groove 21 and a first right groove 22, and the first left groove 21 and the first right groove 22 are both arranged along a length direction of the sloping plate 2; the top plate 4 is provided with a second left groove 41 and a second right groove 42, and both the second left groove 41 and the second right groove 42 are arranged along a length direction of the top plate 4; the first left groove 21 is communicated with the second left groove 41, and the first right groove 22 is communicated with the second right groove 42; bottoms of the first left groove 21, the first right groove 22, the second left groove 41 and the second right groove 42 are all coplanar with a bottom of the base frame 1. The rear plate 5 is provided with a third left groove 51 and a third right groove 52, and the third left groove 51 and the third right groove 52 are both arranged vertically; the second left groove 41 is communicated with the third left groove 51, and the second right groove 42 is communicated with the third right groove 52; the third left groove 51 is inclined from one end close to the top plate 4 to the other end away from the third right groove 52, and the third right groove 52 is inclined from one end close to the top plate 4 to the other end away from the third left groove 51. The first left groove 21, the second left groove 41 and the third left groove 51 are communicated with each other, and the first right groove 22, the second right groove 42 and the third right groove 52 are communicated with each other, so that two continuous grooves are formed on the vehicle ramp, which is conducive to structural stability and production processing. The first left groove 21, the first right groove 22, the second left groove 41 and the second right groove 42 increase the contact area between the vehicle ramp and the ground, thereby increasing the strength of the vehicle ramp.

As shown in FIGS. 1 and 2, both the first left groove 21 and the second left groove 41 are formed with left arc-shaped depressions 211, and both positions of the first right groove 22 and the second right groove 42 corresponding to the left arc-shaped depressions 211 are formed with right arc-shaped depressions 221. Cross-sectional areas of the left arc-shaped depressions (211) and the right arc-shaped depressions (221) gradually increase from the bottom to the top. A convex surface of the left arc-shaped depression 211 faces toward the right arc-shaped depression 221, and a convex surface of the right arc-shaped depression 221 faces toward the left arc-shaped depression 211; the two side plates 3 are proved with a plurality of arc-shaped grooves 31, and convex surfaces of the arc-shaped grooves 31 are all arranged to face toward the side plate 3 on the other side. Positions of the rear plate 5 close to the third left groove 51 and the third right groove 52 are both provided with rear arc-shaped depressions 54, and a concave surface of the rear arc-shape depression 54 is arranged to face toward the top plate 4. The left arc-shaped depressions 211, the right arc-shaped depressions 221 and the arc-shaped grooves 31 may all effectively improve the rigidity of the vehicle ramp. An inner arch structure formed by the left arc-shaped depression 211 and the right arc-shaped depression 221 may share the lateral load and generate an internal stress to offset the horizontal shear force generated in the motion and the stationary state of the vehicle, thereby further increasing the strength of the vehicle ramp.

Figure 3:
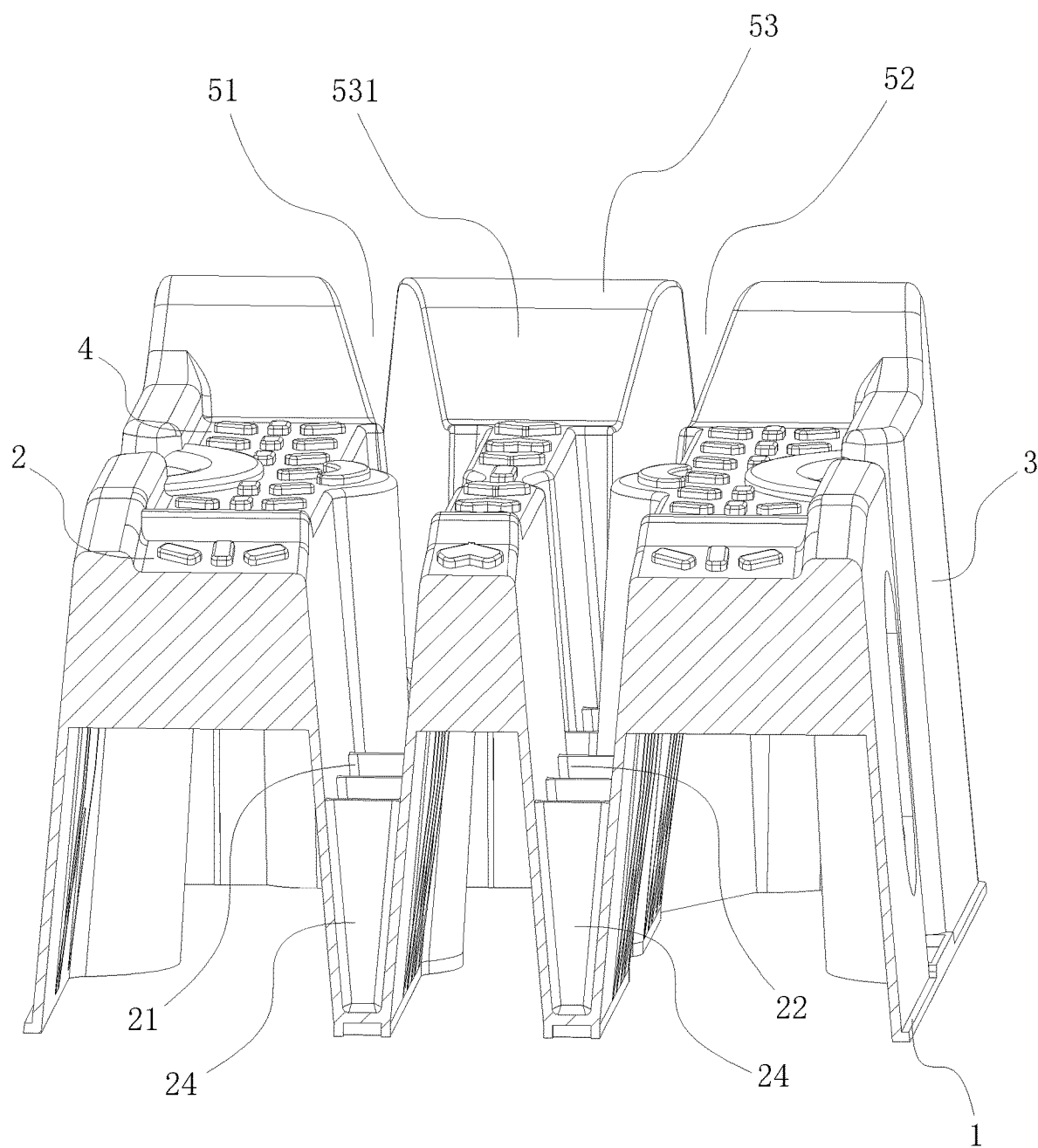
FIG. 3 is a sectional diagram of a first left groove, a second left groove, a first right groove and a second right groove according to the invention.
Figure 4:
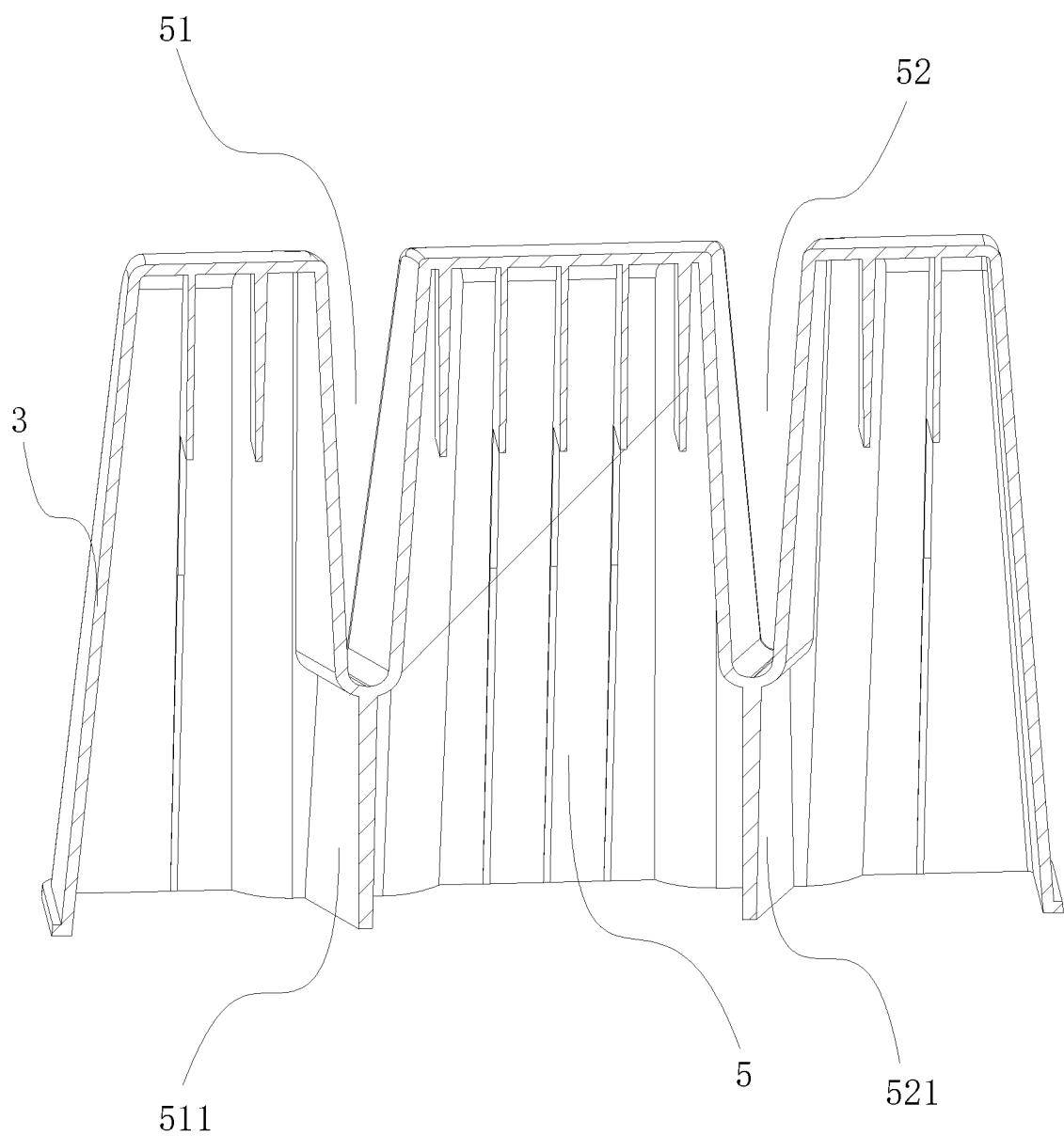
FIG. 4 is a sectional diagram of a third left groove and a third right groove according to the invention.

As shown in FIGS. 3 and 4, widths of the first left groove 21, the first right groove 22, the second left groove 41, the second right groove 42, the third left groove 51 and the third right groove 52 gradually decrease from the top to the bottom; the bottom of the third left groove 51 is fixedly connected with a left support plate 511, the left support plate 511 is fixedly connected on the second left groove 41, and an inclination direction of the left support plate 511 is the same as an inclination direction of the third left groove 51; the bottom of the third right groove 52 is fixedly connected with a right support plate 521, the right support plate 521 is fixedly connected on the second right groove 42, and an inclination direction of the right support plate 521 is the same as an inclination direction of the third right groove 52; bottoms of the left support plate 511 and the right support plate 521 are both coplanar with the bottom of the base frame 1. The tapered structure with a narrow bottom and a wide top increases strength of the vehicle ramp and makes the vehicle ramp easier to stack on each other, and the left support plate 511 and the right support plate 521 may effectively extend the third left groove 51 and the third right groove 52 to increase the strength of the rear part of the vehicle ramp.

As shown in FIGS. 1 and 2, bottoms of the arc-shaped groove 31 and the rear arc-shaped depression 54 are fixedly connected with an arc-shaped plate 32, and the arc-shaped plate 32 is fixedly connected on the base frame 1. The arc-shaped plate 32 increases the contact area between the vehicle ramp and the ground, and the arc-shaped plate 32 is also conducive to the shaping of the arc-shaped groove 31 and the rear arc-shaped depression 54, thereby further increasing the strength of the vehicle ramp.

As shown in FIG. 3, a top of the rear plate 5 is fixedly connected with a rear protrusion 53, a height of the rear protrusion 53 exceeds the top plate 4, and one side of the rear protrusion 53 close to the top plate 4 is provided with a rear slope 531. The rear slope 531 is inclined upward from one side close to the top plate 4 to the other side. When the vehicle is driving on the vehicle ramp, the rear protrusion 53 will block the wheels, reducing the possibility of the wheels running over the vehicle ramp and increasing the safety of use.

Figure 5:
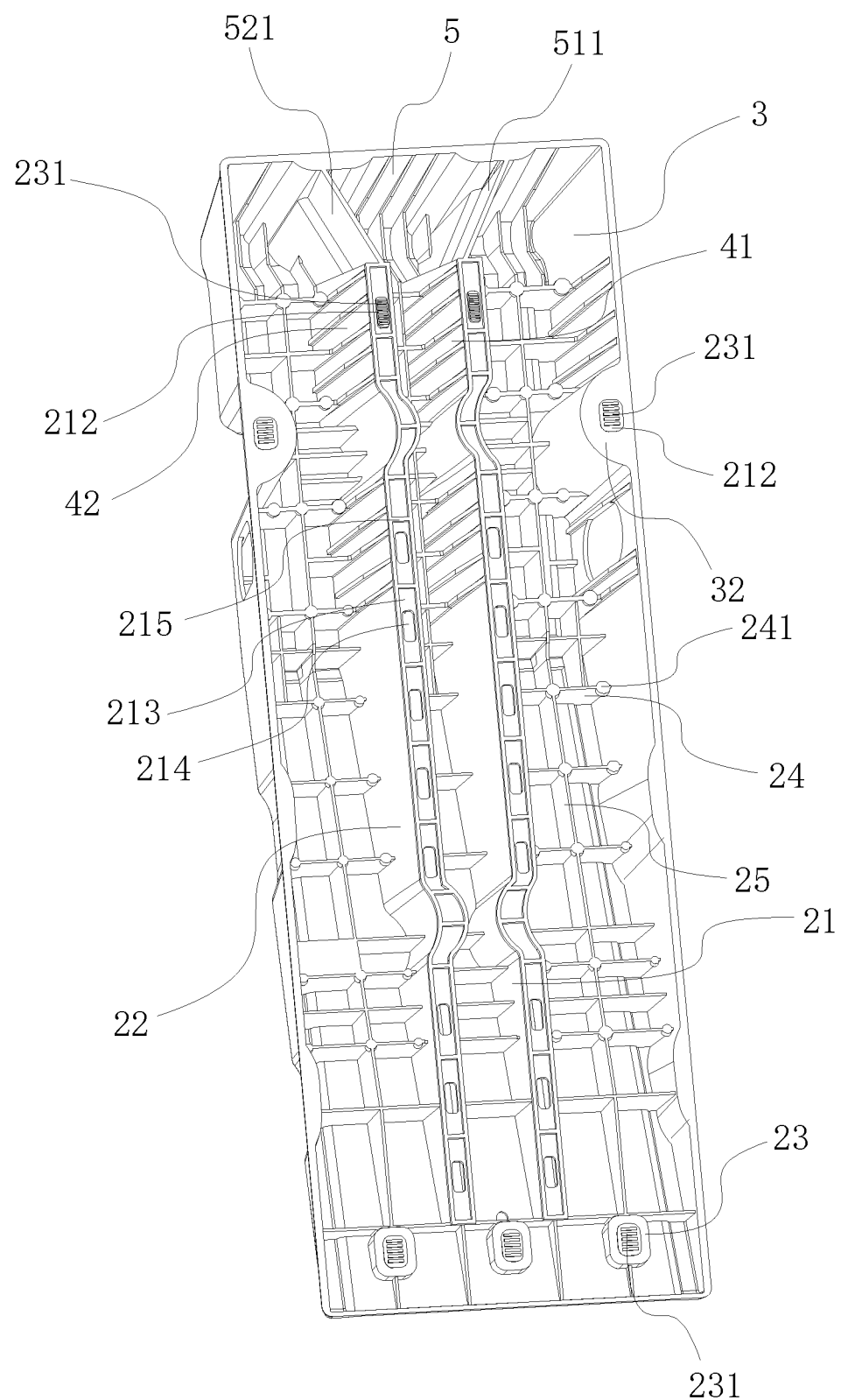
FIG. 5 is a diagram of bottoms of a sloping plate and a top plate according to the invention.

As shown in FIG. 5, a plurality of first anti-skid blocks 23 are fixedly connected to the slope near a lower end; a bottom of the arc-shaped plate 32 just below the top plate 4, and positions of the second left groove 41 and the second right groove 42 close to the rear plate (5) are both fixedly connected with a second anti-skid block 212; bottoms of the first anti-skid block 23 and the second anti-skid block 212 are both fixed with a first anti-skid pattern 231. The first anti-skid block 23 effectively enhances the friction between the vehicle ramp and the ground, so that the wear on the bottom of the product is reduced and the product life is prolonged.

As shown in FIG. 5, bottoms of the first left groove 21, the first right groove 22, the second left groove 41 and the second right groove 42 are all provided with drainage depressions 213, and positions of the bottoms of the first left groove 21, the first right groove 22, the second left groove 41 and the second right groove 42 corresponding to the drainage depressions 213 are all provided with drainage through grooves 214. The positions of the bottoms of the first left groove 21, the first right groove 22, the second left groove 41 and the second right groove 42 corresponding to the drainage depressions 213 are all provided with a plurality of drainage reinforced ribs 215, and the drainage reinforced ribs 215 are all arranged along a width direction of the base frame 1. After water enters the first left groove 21, the first right groove 22, the second left groove 41 or the second right groove 42, water may be drained through the drainage through groove 214 and will not accumulate inside, and the drainage depression 213 is used to ensure that the drainage through groove 214 has a certain height with respect to the ground to ensure smooth drainage. The drainage reinforced rib 215 makes up for the disadvantage of weakening the strength of the bottom of the vehicle ramp caused by the drainage depression 213, and ensures the strength of the bottom of the vehicle ramp.

As shown in FIG. 5, outer sides of the second left groove 41 and the second right groove 42 and bottoms of the sloping plate 2 and the top plate 4 are fixedly connected with a plurality of horizontal reinforced ribs 24, and the bottoms of the sloping plate 2 and the top plate 4 are fixedly connected with a plurality of vertical reinforced ribs 25; the horizontal reinforced ribs 24 are all arranged along the width direction of the base frame 1, and the vertical reinforced ribs 25 are all arranged along a length direction of the base frame 1; heights of bottoms surface of the horizontal reinforced ribs 24 and the vertical reinforced ribs 25 are higher than a height of the base frame 1. The bottoms of the plurality of horizontal reinforced ribs 24 are fixedly connected with round-shaped reinforced ribs 241. The horizontal reinforced rib 24 and the vertical reinforced rib 25 increase the strength of the vehicle ramp, but will not affect the stacking of the vehicle ramp due to their larger height. The round-shaped reinforced rib 241 is used to strengthen the strength of the horizontal reinforced rib 24 under key stress.

The invention provides a stacked vehicle ramp, which is implemented by the following principles: the left arc-shaped depressions 211, the right arc-shaped depressions 221 and the arc-shaped grooves 31 may effectively improve the rigidity of the vehicle ramp, and the first left groove 21, the first right groove 22, the second left groove 41 and the second right groove 42 increase the contact area between the vehicle ramp and the ground, thereby increasing the strength of the vehicle ramp; an inner arch structure formed by the left arc-shaped depression 211 and the right arc-shaped depression 221 may share the lateral load and generate an internal stress to offset the horizontal shear force generated in the motion and the stationary state of the vehicle, thereby further increasing the strength of the vehicle ramp; in this way, the vehicle ramp of the application may be sufficient to support the vehicle by using lightweight materials such as plastics to facilitate the user to carry and move, and the vehicle ramps may be stacked on top of each other since the bottoms are hollow to facilitate carrying a plurality of vehicle ramps in the vehicle at the same time without taking up too much space.

The embodiments of the invention described above do not limit the protection scope of the invention. Any modification, equivalent replacement, improvement and the like made within the spirit and principle of the invention should be included in a scope of protection of the claims of the invention.

The invention claimed is:

1. A stacked vehicle ramp, comprising a base frame (1), wherein one end of the base frame (1) is fixedly connected with a sloping plate (2), and both sides of the base frame (1) are fixedly provided with a side plate (3); the other end of the base frame (1) is fixedly connected with a rear plate (5), and the sloping plate (2) is inclined upward from one end of the base frame (1) away from the rear plate (5) to the other end; a higher end of the sloping plate (2) is fixedly connected with a top plate (4) that is horizontally arranged; the sloping plate (2), the top plate (4) and the rear plate (5) are all fixedly connected between the two side plates (3), and one end of the top plate (4) away from the sloping plate (2) is fixedly connected to the rear plate (5);

the sloping plate (2) is provided with a first left groove (21) and a first right groove (22), and the first left groove (21) and the first right groove (22) are both arranged along a length direction of the sloping plate (2); the top plate (4) is provided with a second left groove (41) and a second right groove (42), and both the second left groove (41) and the second right groove (42) are arranged along a length direction of the top plate (4); the first left groove (21) is communicated with the second left groove (41), and the first right groove (22) is communicated with the second right groove (42); bottoms of the first left groove (21), the first right groove (22), the second left groove (41) and the second right groove (42) are all coplanar with a bottom of the base frame (1);

both the first left groove (21) and the second left groove (41) are formed with left arc-shaped depressions (211), and both positions of the first right groove (22) and the second right groove (42) corresponding to the left arc-shaped depressions (211) are formed with right arc-shaped depressions (221); cross-sectional areas of the first left groove (21), the first right groove (22), the second left groove (41), the second right groove (42), the left arc-shaped depressions (211) and the right arc-shaped depressions (221) gradually increase from the bottom to the top; a convex surface of the left arc-shaped depression (211) faces toward the right arc-shaped depression (221), and a convex surface of the right arc-shaped depression (221) faces toward the left arc-shaped depression (211); the two side plates (3) are proved with a plurality of arc-shaped grooves (31), and convex surfaces of the arc-shaped grooves (31) are all arranged to face toward the side plate (3) on the other side.

2. The stacked vehicle ramp according to claim 1, wherein a top of the rear plate (5) is fixedly connected with a rear protrusion (53), a height of the rear protrusion (53) exceeds the top plate (4), and one side of the rear protrusion (53) close to the top plate (4) is provided with a rear slope (531); the rear slope (531) is inclined upward from one side close to the top plate (4) to the other side, and the rear plate (5) is provided with a third left groove (51) and a third right groove (52), and the third left groove (51) and the third right groove (52) are both arranged vertically; the second left groove (41) is communicated with the third left groove (51), and the second right groove (42) is communicated with the third right groove (52); the third left groove (51) is inclined from one end close to the top plate (4) to the other end away from the third right groove (52), and the third right groove (52) is inclined from one end close to the top plate (4) to the other end away from the third left groove (51); positions of the rear plate (5) close to the third left groove (51) and the third right groove (52) are both provided with rear arc-shaped depressions (54), and a concave surface of the rear arc-shape depression (54) is arranged to face toward the top plate (4).

3. The stacked vehicle ramp according to claim 2, wherein bottoms of the arc-shaped groove (31) and the rear arc-shaped depression (54) are fixedly connected with an arc-shaped plate (32), and the arc-shaped plate (32) is fixedly connected on the base frame (1).

4. The stacked vehicle ramp according to claim 3, wherein a plurality of first anti-skid blocks (23) are fixedly connected to the sloping plate (2) near a lower end; a bottom of the arc-shaped plate (32) just below the top plate (4), and positions of the second left groove (41) and the second right groove (42) close to the rear plate (5) are both fixedly connected with a second anti-skid block (212); bottoms of the first anti-skid block (23) and the second anti-skid block (212) are both fixed with a first anti-skid pattern (231).

5. The stacked vehicle ramp according to claim 2, wherein widths of the first left groove (21), the first right groove (22), the second left groove (41), the second right groove (42), the third left groove (51) and the third right groove (52) gradually decrease from the top to the bottom; the bottom of the third left groove (51) is fixedly connected with a left support plate (511), the left support plate (511) is fixedly connected on the second left groove (41), and an inclination direction of the left support plate (511) is the same as an inclination direction of the third left groove (51); the bottom of the third right groove (52) is fixedly connected with a right support plate (521), the right support plate (521) is fixedly connected on the second right groove (42), and an inclination direction of the right support plate (521) is the same as an inclination direction of the third right groove (52); bottoms of the left support plate (511) and the right support plate (521) are both coplanar with the bottom of the base frame (1).

6. The stacked vehicle ramp according to claim 1, wherein bottoms of the first left groove (21), the first right groove (22), the second left groove (41) and the second right groove (42) are all provided with drainage depressions (213), and positions of the bottoms of the first left groove (21), the first right groove (22), the second left groove (41) and the second right groove (42) corresponding to the drainage depressions (213) are all provided with drainage through grooves (214).

7. The stacked vehicle ramp according to claim 6, wherein the positions of the bottoms of the first left groove (21), the first right groove (22), the second left groove (41) and the second right groove (42) corresponding to the drainage depressions (213) are all provided with a plurality of drainage reinforced ribs (215), and the drainage reinforced ribs (215) are all arranged along a width direction of the base frame (1).

8. The stacked vehicle ramp according to claim 1, wherein outer sides of the second left groove (41) and the second right groove (42) and bottoms of the sloping plate (2) and the top plate (4) are fixedly connected with a plurality of horizontal reinforced ribs (24), and the bottoms of the sloping plate (2) and the top plate (4) are fixedly connected with a plurality of vertical reinforced ribs (25); the horizontal reinforced ribs (24) are all arranged along the width direction of the base frame (1), and the vertical reinforced ribs (25) are all arranged along a length direction of the base frame (1); heights of bottoms surface of the horizontal reinforced ribs (24) and the vertical reinforced ribs (25) are higher than a height of the base frame (1).

9. The stacked vehicle ramp according to claim 8, wherein the bottoms of the plurality of horizontal reinforced ribs (24) are fixedly connected with round-shaped reinforced ribs (241).

10. The stacked vehicle ramp according to claim 1, wherein both sides of the sloping plate (2) are fixedly connected with first side rails (26), and both sides of the top plate (4) are fixedly connected with second side rails (43); the first side rails (26) are all arranged along a length direction of the sloping plate (2), and the second side rails (43) are all arranged along a length direction of the top plate (4); the first side rail (26) is higher than an upper surface of the sloping plate (2), and the second side rail (43) is higher than an upper surface of the top plate (4).

* * * * *